(12) United States Patent  
Yahav et al.

(10) Patent No.: US 12,086,907 B2  
(45) Date of Patent: Sep. 10, 2024

(54) SYSTEM AND METHOD FOR GENERATING A COLORED IMAGE OF A SCENE

(71) Applicant: ELBIT SYSTEMS LTD., Haifa (IL)

(72) Inventors: Aviel Neeman Yahav, Haifa (IL); Yoav Honig, Haifa (IL)

(73) Assignee: ELBIT SYSTEMS LTD., Haifa (IL)

( * ) Notice: Subject to any disclaimer, the term of this patent is extended or adjusted under 35 U.S.C. 154(b) by 0 days.

(21) Appl. No.: 18/418,274

(22) Filed: Jan. 21, 2024

(65) Prior Publication Data

US 2024/0221243 A1 Jul. 4, 2024

Related U.S. Application Data

(63) Continuation of application No. PCT/IL2023/050654, filed on Jun. 25, 2023.

(60) Provisional application No. 63/477,226, filed on Dec. 27, 2022.

(30) Foreign Application Priority Data

Jul. 18, 2022 (IL) .......................................... 294857

(51) Int. Cl.
  *G06T 11/00* (2006.01)
  *G06T 7/30* (2017.01)
  *G06T 11/40* (2006.01)

(52) U.S. Cl.
  CPC .............. *G06T 11/001* (2013.01); *G06T 7/30* (2017.01); *G06T 2207/10024* (2013.01); *G06T 2207/10032* (2013.01); *G06T 2207/10048* (2013.01); *G06T 2210/32* (2013.01)

(58) Field of Classification Search
  None
  See application file for complete search history.

(56) References Cited

U.S. PATENT DOCUMENTS

| 10,298,859 | B2* | 5/2019 | Frost ........................ H04N 9/43 |
| 2012/0210853 | A1* | 8/2012 | Abershitz ................ B64F 1/04 |
| | | | 89/1.11 |
| 2015/0281599 | A1 | 10/2015 | Slaby et al. |
| 2018/0097972 | A1 | 4/2018 | Bourret |
| 2020/0193328 | A1 | 6/2020 | Guestrin et al. |
| 2021/0104031 | A1* | 4/2021 | Imagawa ............... G01B 11/16 |

* cited by examiner

*Primary Examiner* — Tize Ma  
(74) *Attorney, Agent, or Firm* — S. J. Intellectual Property Ltd.

(57) ABSTRACT

A system for coloring a monochromatic image of a scene, the system comprising a processing circuitry configured to: capture the monochromatic image of the scene utilizing a non-visible spectrum sensor, capable of capturing monochromatic images from a viewpoint having a given position and a given orientation; obtain one or more previously captured color images, covering at least part of the scene; determine a registration between the monochromatic image and the previously captured color images; render one or more rendered images, being the previously captured color images adjusted to the viewpoint by utilizing the registration; and generate a colored image of the scene by changing, for at least one given pixel of the monochromatic image, values of one or more chroma components of the given pixel in accordance with values of one or more chroma components of a corresponding pixel of the rendered images.

13 Claims, 3 Drawing Sheets

Fig. 3

SYSTEM AND METHOD FOR GENERATING A COLORED IMAGE OF A SCENE

TECHNICAL FIELD

The invention relates to a system and method for generating a colored image of a scene based on luma components of a monochromatic image of the scene and on chroma components of previously captured color images of at least part of the scene.

BACKGROUND

Non-visible spectrum sensor, such as: night vision systems, are based on non-visible spectrum sensors such as: Infra-Red (IR) sensors, Short-Wave Infra-Red (SWIR) sensors or Low Light Level Television (LLTV) sensors. These systems provide monochromatic images of a captured scene. A user of such non-visible spectrum sensors is limited in the ability to understand what is happening within the scene due to the lack of color imagery. For example: an aircraft, when using such non-visible spectrum sensors, provides the pilot of the aircraft with monochromatic video of the scene captured from the aircraft's sensor. Situation awareness is a demanding task for the already loaded pilot and the provided monochromatic video is inadequate. Providing a colored video can dramatically increase the pilot's situation awareness capabilities.

In many cases, there is accessibility to previously captured color images of at least part of the same scene that is currently imaged by the non-visible spectrum sensor. Current systems do not utilize these previously captured color images to apply colors to the monochromatic image and to generate a colored image of the scene. In cases, current system does utilize these previously captured color images they do not combine them with the real-time information captured by non-visible spectrum sensors.

Each of the previously captured colored image and the non-visible spectrum sensor image have benefits and drawbacks—the previously captured colored image have better visibility and easy situation awareness support, but lack information of current details and elements captured during a current mission. The non-visible spectrum sensor image comprises the current updated details captured during the current mission, but has lower visibility and situation awareness. There is thus a need for generating a fused image which is a colored image that includes the updated details and elements information from the current mission.

There is thus a need in the art for a new method and system for generating a colored image of a scene based on luma components of a monochromatic image of the scene and on chroma components of previously captured color images of at least part of the scene.

GENERAL DESCRIPTION

In accordance with a first aspect of the presently disclosed subject matter, there is provided a system for coloring a monochromatic image of a scene, the system comprising a processing circuitry configured to: capture the monochromatic image of the scene utilizing a non-visible spectrum sensor, capable of capturing monochromatic images from a viewpoint having a given position and a given orientation; obtain one or more previously captured color images, covering at least part of the scene, wherein the previously captured color images have been captured in a time prior to the capturing of the monochromatic image; determine a registration between the monochromatic image and the previously captured color images, wherein the registration is determined by projecting the previously captured color images on a plane that is conformal with the viewpoint; render one or more rendered images, being the previously captured color images adjusted to the viewpoint by utilizing the registration; and generate a colored image of the scene by changing, for at least one given pixel of the monochromatic image, values of one or more chroma components of the given pixel in accordance with values of one or more chroma components of a corresponding pixel of the rendered images.

In some cases, the monochromatic image comprises one or more imaged elements that are not included in the one or more previously captured color images and wherein the generated colored image includes the imaged elements.

In some cases, the registration between the monochromatic image and the previously captured color images is also determined based on a first geo-registration of the monochromatic image to earth coordinate system and a second geo-registration of the previously captured color images wherein the generation of the colored image utilizes the first geo-registration and the second geo-registration to register the pixels of the monochromatic image with corresponding pixels of the previously captured color images.

In some cases, the registration between the monochromatic image and the previously captured color images is determined by projecting the previously captured color images on a plane that is conformal with the viewpoint.

In some cases, the non-visible spectrum sensor is a night vision sensor.

In some cases, the non-visible spectrum sensor is an airborne sensor.

In some cases, the colored image of the scene is in a YCbCr format.

In some cases, the colored image of the scene is in an HSV format.

In accordance with a second aspect of the presently disclosed subject matter, there is provided a method for coloring a monochromatic image of a scene, the method comprising: capturing, by a processing circuitry, the monochromatic image of the scene utilizing a non-visible spectrum sensor, capable of capturing monochromatic images from a viewpoint having a given position and a given orientation; obtaining, by the processing circuitry, one or more previously captured color images, covering at least part of the scene, wherein the previously captured color images have been captured in a time prior to the capturing of the monochromatic image; determining, by the processing circuitry, a registration between the monochromatic image and the previously captured color images, wherein the registration is determined by projecting the previously captured color images on a plane that is conformal with the viewpoint; render one or more rendered images, being the previously captured color images adjusted to the viewpoint by utilizing the registration; and generating, by the processing circuitry, a colored image of the scene by changing, for at least one given pixel of the monochromatic image, values of one or more chroma components of the given pixel in accordance with values of one or more chroma components of a corresponding pixel of the rendered images.

In some cases, the monochromatic image comprises one or more imaged elements that are not included in the one or more previously captured color images and wherein the generated colored image includes the imaged elements.

In some cases, the registration between the monochromatic image and the previously captured color images is also determined based on a first geo-registration of the monochromatic image to earth coordinate system and a second geo-registration of the previously captured color images wherein the generation of the colored image utilizes the first geo-registration and the second geo-registration to register the pixels of the monochromatic image with corresponding pixels of the previously captured color images.

In some cases, the registration between the monochromatic image and the previously captured color images is determined by projecting the previously captured color images on a plane that is conformal with the viewpoint.

In some cases, the non-visible spectrum sensor is a night vision sensor.

In some cases, the non-visible spectrum sensor is an airborne sensor.

In some cases, the colored image of the scene is in a YCbCr format.

In some cases, the colored image of the scene is in an HSV format.

In accordance with a second aspect of the presently disclosed subject matter, there is provided a non-transitory computer readable storage medium having computer readable program code embodied therewith, the computer readable program code, executable by at least one processor of a computer to perform a method for detecting movement of at least one non-line-of-sight object, the method comprising: capturing, by a processing circuitry, the monochromatic image of the scene utilizing a non-visible spectrum sensor, capable of capturing monochromatic images from a viewpoint having a given position and a given orientation; obtaining, by the processing circuitry, one or more previously captured color images, covering at least part of the scene, wherein the previously captured color images have been captured in a time prior to the capturing of the monochromatic image; determining, by the processing circuitry, a registration between the monochromatic image and the previously captured color images, wherein the registration is determined by projecting the previously captured color images on a plane that is conformal with the viewpoint; render one or more rendered images, being the previously captured color images adjusted to the viewpoint by utilizing the registration; and generating, by the processing circuitry, a colored image of the scene by changing, for at least one given pixel of the monochromatic image, values of one or more chroma components of the given pixel in accordance with values of one or more chroma components of a corresponding pixel of the rendered images.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "generating", "formatting", "determining", "capturing", "performing", "updating", "transmitting", "receiving" or the like, include action and/or processes of a computer that manipulate and/or transform data into other data, said data represented as physical quantities, e.g., such as electronic quantities, and/or said data representing the physical objects. The terms "computer", "processor", "processing resource", "processing circuitry" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
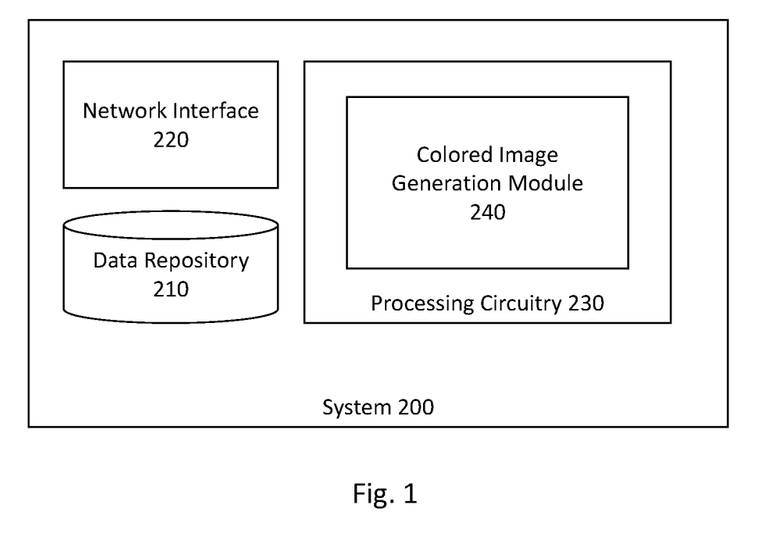
FIG. 1 is a block diagram schematically illustrating one example of a system for generating a colored image of a scene based on luma components of a monochromatic image of the scene and on chroma components of previously captured color images of at least part of the scene, in accordance with the presently disclosed subject matter.
Figure 2:
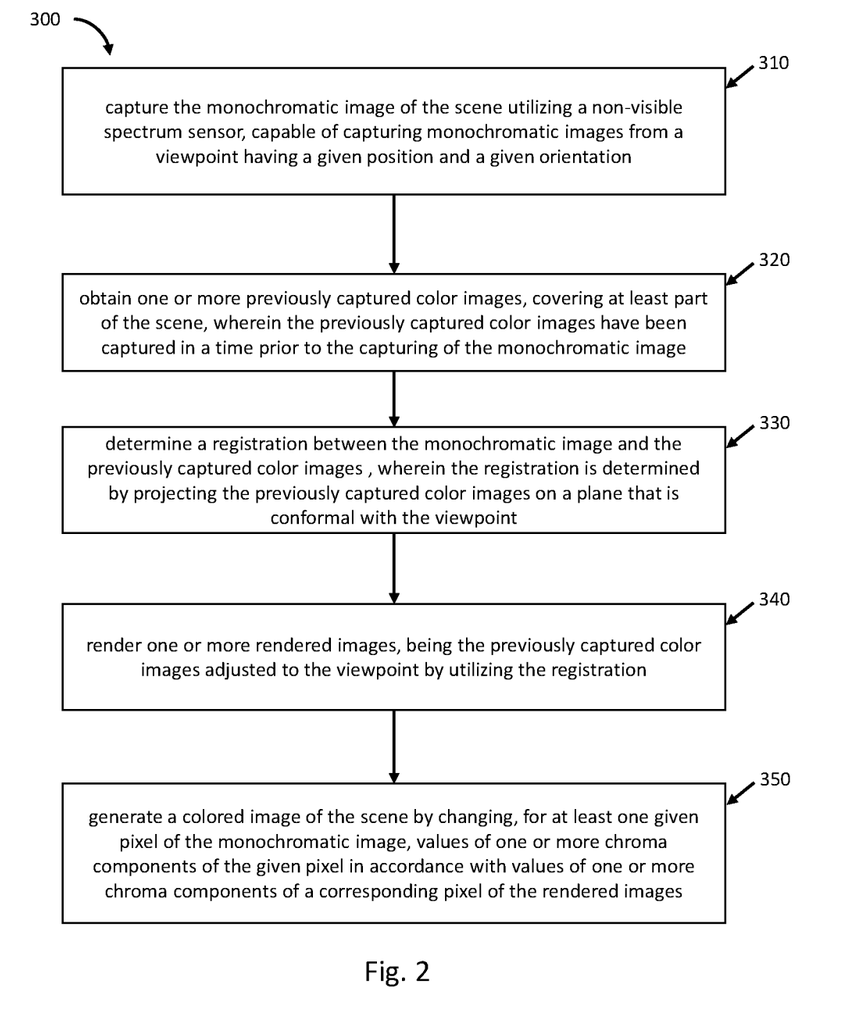
FIG. 2 is a flowchart illustrating one example of a sequence of operations carried out for generating a colored image of a scene based on luma components of a monochromatic image of the scene and on chroma components of previously captured color images of at least part of the scene, in accordance with the presently disclosed subject matter.

In embodiments of the presently disclosed subject matter, fewer, more and/or different stages than those shown in FIG. 2 may be executed. In embodiments of the presently disclosed subject matter one or more stages illustrated in FIG. 2 may be executed in a different order and/or one or more groups of stages may be executed simultaneously. FIG. 1 illustrate a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, is a block diagram schematically illustrating one example of a system for generating a colored image of a scene based on luma components of a monochromatic image of the scene and on chroma components of previously captured color images of at least part of the scene, in accordance with the presently disclosed subject matter.

System 200 can be part of a non-visible spectrum sensor, such as: IR sensor, SWIR sensor or LLTV sensor, capable of capturing monochromatic images from a viewpoint having a given position and a given orientation. In some cases, system 200 is installed on a platform carrying the non-visible spectrum sensor (such as: an ariel platform). In some cases, system 200 is distributed between a number of locations. For example: parts of system 200 can be installed on the platform and parts of system 200 can be installed on a ground station which is in communication with the platform.

System 200 can comprise or be otherwise associated with a data repository 210 (e.g., a database, a storage system, a memory including Read Only Memory—ROM, Random Access Memory—RAM, or any other type of memory, etc.) configured to store data, including, inter alia, monochromatic images of the scene, previously captured color images, covering at least part of the scene, generated generate a colored image of the scene, luma components of pixels of the monochromatic images, chroma components of pixels of the previously captured color images, position and orientation of a sensor when capturing the monochromatic images of the scene, etc. In some cases, data repository 210 can be further configured to enable retrieval and/or update and/or deletion of the data stored thereon. It is to be noted that in some cases, data repository 210 can be local and in other cases it can be distributed. It is to be noted that in some cases, data repository 210 can be stored in on cloud-based storage.

System 200 can further comprise a network interface 220 enabling connecting the system 200 to the communication network and enabling it to send and receive data, such as previously captured color images, covering at least part of the scene. In some cases, the network interface 220 can be connected to a Local Area Network (LAN), to a Wide Area Network (WAN), or to the Internet. In some cases, the network interface 220 can connect to a wireless network.

System 200 further comprises processing circuitry 230. Processing circuitry 230 can be one or more processing circuitry units (e.g., central processing units), microprocessors, microcontrollers (e.g., microcontroller units (MCUs)) or any other computing devices or modules, including multiple and/or parallel and/or distributed processing circuitry units, which are adapted to independently or cooperatively process data for controlling relevant system 200 resources and for enabling operations related to system 200 resources.

The processing circuitry 230 comprises the following module: colored image generation module 240.

Colored image generation module 240 can be configured to perform a colored image generation process, as further detailed herein, inter alia with reference to FIG. 2.

FIG. 2 is a flowchart illustrating one example of a sequence of operations carried out for generating a colored image of a scene based on luma components of a monochromatic image of the scene and on chroma components of previously captured color images of at least part of the scene, in accordance with the presently disclosed subject matter.

According to certain examples of the presently disclosed subject matter, system 200 can be configured to perform a colored image generation process 300, e.g., utilizing the colored image generation module 240, including activities for generating a colored image of a scene by fusing a monochromatic image of the scene which is currently captured and comprises the current updated details of the scene, but is monochromatic, with previously captured color images of the scene, that may lack current and/or updated details of the scene, but have the visibility and easy situation awareness that is associated with color images. System 200 is thereby a system for coloring the currently captured monochromatic image, based on previously captured color images, The colored image of the scene can be generated based on a monochromatic image of the scene, captured utilizing a non-visible spectrum sensor, capable of capturing monochromatic images from a viewpoint having a given position and a given orientation. In some cases, system 200 is airborne. In a non-limiting example, the non-visible spectrum sensor is installed on an aerial platform and the monochromatic image can be captured during a given flight mission. The aerial platform's position and orientation and the non-visible spectrum sensor's position and orientation can be utilized to determine the given position and given orientation from which the monochromatic image was captured. System 200 can use previously captured color images of at least part of the scene. The previously captured color images have been captured, for example, during previous missions, preceding the given flight mission. In other cases, the previously captured color images have been captured in a time earlier to the capture time of the monochromatic image. System 200 can have access to the position and orientation from which the previously captured color images have been captured.

The previously captured color images can be stored in a 3-dimensional database of colored images or in a regional color database (for example: an Orthophoto database). In some cases, these colored images have been rendered from the same position and orientation of the aerial platform and laid over the terrain. These images can be also generated from a data base of Digital Terrain Elevation Data (DTED). This rendering creates a colored image set which is conformal to the monochromatic image captured by the non-visible spectrum sensor. The previously captured color images can be stored in the non-visible spectrum sensor and/or on the aerial platform and/or on a ground station and/or any place that system 200 can communicate with. The previously captured color images can be used by System 200 to apply colors to the monochromatic image. System 200 can use the previously captured color images to set the chroma components of pixels of the monochromatic image. In a non-limiting example, system 200 renders a conformal color image of at least part of the scene based on the previously captured color images. System 200 can generate the colored image of the scene by keeping the luma components in some of the pixels of the monochromatic image and changing the chroma components of the pixels of the monochromatic image in accordance with values of one or more chroma components of corresponding pixels of the rendered conformal color image.

For this purpose, system 200 can be configured to capture the monochromatic image of the scene utilizing a non-visible spectrum sensor, capable of capturing monochromatic images from a viewpoint having a given position and a given orientation (block 310). In some cases, the monochromatic image of the scene is captured by the non-visible spectrum sensor in real-time during the current mission. Continuing our non-limiting example, the non-visible spectrum sensor can be installed on an aerial platform (e.g., an airborne sensor) and the monochromatic image is captured during a given flight mission. In some cases, the non-visible spectrum sensor is a night vision sensor.

After capturing the monochromatic image, system 200 can be further configured to obtain one or more previously captured color images, covering at least part of the scene, wherein the previously captured color images have been captured in a time prior to the capturing of the monochromatic image (block 320). The previously captured color images have been captured, for example, during previous missions, preceding the given flight mission. In other cases, the previously captured color images have been captured in a time earlier to the capture time of the monochromatic image. System 200 can have access to the position and orientation from which the previously captured color images have been captured.

In some cases, the monochromatic image comprises one or more imaged elements that are not included in the one or more previously captured color images. For example: a tree was captured in the monochromatic image of the scene, but the same tree was not captured in the previously captured color images, for example, because it did not exist when the previously captured color images were captured). It is noted that in these cases, a generated colored image based on the monochromatic image and the previously captured color images (see block 350 below) includes the imaged elements so that the reality of the current mission, as captured by the non-visible spectrum sensor, is shown in the generated colored image.

Once system 200 obtained the one or more previously captured color images, system 200 can be further configured to determine a registration between the monochromatic image and the previously captured color images, wherein the registration is determined by projecting the previously captured color images on a plane that is conformal with the viewpoint (block 330).

In some cases, the registration between the monochromatic image and the previously captured color images is determined based on a first geo-registration of the monochromatic image to earth coordinate system and a second geo-registration of the previously captured color images wherein the generation of the colored image utilizes the first geo-registration and the second geo-registration to register the pixels of the monochromatic image with corresponding pixels of the previously captured color images. As a non-limiting example: The monochromatic image is captured during a current mission by utilizing the non-visible spectrum sensor from a viewpoint having a given position and a given orientation. The given position and given orientation determine the first geo-registration of the monochromatic image to earth coordinate system. The previously captured colored images have been captured on previous missions by utilizing a color sensor from another viewpoint having another position and another orientation. Another position and another orientation determine the second geo-registration of the previously captured color images. The generation of the colored image utilizes the first geo-registration and the second geo-registration to register the pixels of the monochromatic image with corresponding pixels of the previously captured color images, for example by projecting the monochromatic image to the earth coordinate (using the first geo-registration) and projecting the previously captured color images to the earth coordinate (using the first geo-registration).

In some cases, the registration between the monochromatic image and the previously captured color images is determined by projecting the previously captured color images on a plane that is conformal with the viewpoint. Continuing the non-limiting example, the monochromatic image is captured during a current mission by utilizing the non-visible spectrum sensor from a viewpoint having a given position and a given orientation. The given position and given orientation can be used to determine a plane that is conformal with the given position and given orientation. The previously captured colored images have been captured on previous missions by utilizing a color sensor from another viewpoint having another position and another orientation. These previously captured colored images can be projected on the determined plane, thereby defining a registration between the monochromatic image and the previously captured color images.

System 200 can be further configured to render one or more rendered images, being the previously captured color images adjusted to the viewpoint by utilizing the registration (block 340). System 200 renders the previously captured color images to the viewpoint of the monochromatic image by utilizing the registration determined in block 330, as further detailed herein, inter alia with reference to FIG. 3.

System 200 can be further configured to generate a colored image of the scene by changing, for at least one given pixel of the monochromatic image, values of one or more chroma components of the given pixel in accordance with values of one or more chroma components of a corresponding pixel of the rendered images (block 350). A non-limiting example of an algorithm for the generation of the colored image of the scene can includes: (i) reading the monochromatic image in Red Green Blue (RGB) format, for example: as captured utilizing the non-visible spectrum sensor during the current mission; (ii) reading the previously captured color images in RGB format, for example: as captured by a color image sensor during previous missions; (iii) converting the previously captured color images from RGB format to a Hue, Saturation, Value (HSV) format or to a YCbCr format; (iv) blend the converted previously captured color images by replacing the luma component of each pixel of the converted previously captured color image with a luma component of a corresponding pixel of the monochromatic image, giving rise to the colored image of the scene in an HSV format or from a YCbCr format; and (v) convert the colored image of the scene from an HSV format or from a YCbCr format to an RGB format, giving rise to the colored image of the scene in an RGB format. This algorithm for the generation of the colored image achieves preservation of the ability to identify details, as in the previously captured colored images, as compared to the monochromatic image, while preventing presentation of elements that exist only within the previously captured colored images, and not within the monochromatic image (thus preventing "ghosts" on the generated colored image).

System 200 can repeat the above process to a series of monochromatic images, in this case, creating a colored video of the scene.

The generated colored image can be presented to a user of system 200 (for example: to a pilot of the aerial platform). The user receives a colored visual imagery of the scene during the mission without losing the ability to identify details in the colored imagery, compared to the monochromatic images. In addition, imaged elements that exist only within the previously captured color images, and not within the monochromatic image are not shown in the generated colored image, thereby preventing "ghosts" elements in the generated colored image—imaged elements that have been is the scene in the past (at the time of the capturing of the previously captured color images) are shown even when they do not exist at the time of the capturing of the monochromatic images during the current mission.

It is to be noted that in some cases, the generated colored image of the scene the is in a YCbCr format. In these cases, the generation of the colored image is done by keeping the Y element (the luma component) of the pixels of the monochromatic image and changing the Cb and Cr elements (the chroma components) of the pixels of the monochromatic image in accordance with the chroma components of a corresponding pixel of the previously captured color images. In some cases, a Hue, Saturation, Value (HSV) method is utilized to generate the colored image of the scene. In these cases, the generation of the colored image is done by keeping the H element (the luma component) of the pixels of the monochromatic image and changing the S and V elements (the chroma components) of the pixels of the monochromatic image in accordance with the chroma components of a corresponding pixel of the previously captured color images.

It is to be noted that, with reference to FIG. 2, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flow diagram is described also with reference to the system elements that realizes them, this is by no means binding, and the blocks can be performed by elements other than those described herein.

Figure 3:
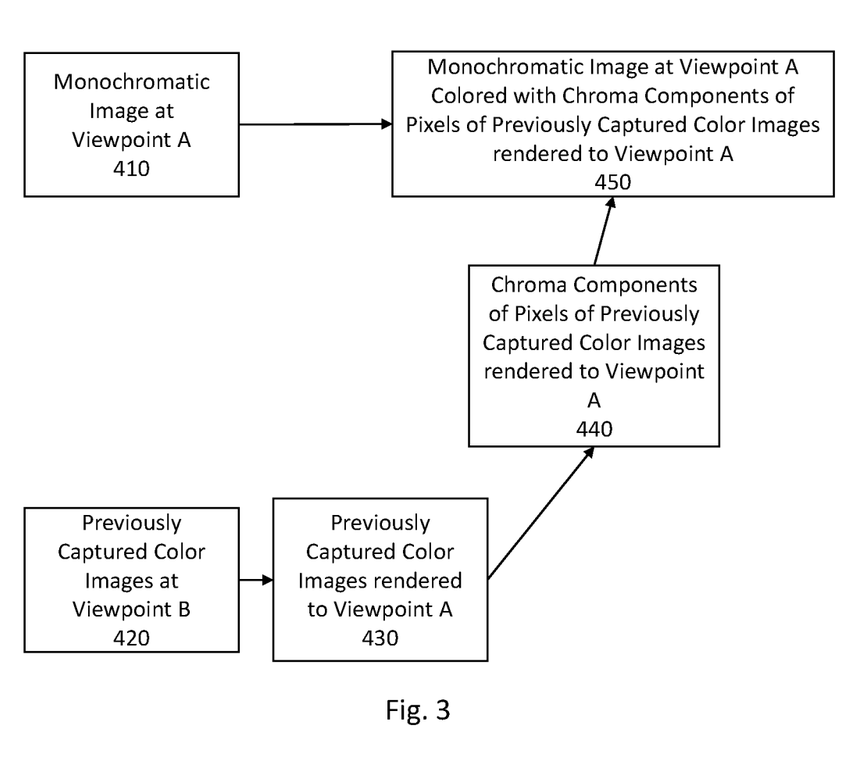
FIG. 3 is a block diagram schematically illustrating one example of generating a colored image of a scene based on a monochromatic image of the scene at viewpoint A and chroma components of previously captured color images of at least part of the scene rendered to viewpoint A, in accordance with the presently disclosed subject matter.

Bearing this in mind, attention is drawn to FIG. 3, a block diagram schematically illustrating one example of generating a colored image of a scene based on a monochromatic image of the scene at viewpoint A and chroma components of previously captured color images of at least part of the scene rendered to viewpoint A, in accordance with the presently disclosed subject matter.

As detailed above, with reference to FIG. 2, system 200 can be configured to perform the colored image generation process 300. This process includes the activities needed for generating a colored image of the scene by fusing a monochromatic image of the scene which is currently captured and comprises the current updated details of the scene (but is monochromatic), with previously captured color images of the scene, that may lack current and/or updated details of the scene, but have the visibility and easy situation awareness that is associated with color images. For this purpose, system 200 can be configured to generate a monochromatic image at the viewpoint that the monochromatic image was captured in (we will label this viewpoint as "viewpoint A") which is colored with chroma components of pixels of previously captured color images rendered to viewpoint A. System 200 captures a monochromatic image at viewpoint A 410. The monochromatic image at viewpoint A 410 lacks color but has all the details of the real-time current situation. For a non-limiting example, monochromatic image at viewpoint A 410 can be captured by an airborne non-visible spectrum sensor capturing as part of the monochromatic image at viewpoint A 410 one or more aerial objects that are part of the real-time scene. System 200 obtains one or more previously captured color images at viewpoint B 420. The one or more previously captured color images at viewpoint B 420 covering at least part of the scene, wherein the previously captured color images have been captured in a time prior to the capturing of the monochromatic image at viewpoint A 410. Viewpoint B can be different from viewpoint A, therefore system 200 renders the previously captured color images at viewpoint B 420 to viewpoint A, thereby generating previously captured color images rendered to viewpoint A 430. The rendering can be done by utilizing a registration between viewpoint A and viewpoint B, wherein the registration is determined by projecting the previously captured color images at viewpoint B 420 on a plane that is conformal with viewpoint A. In some cases, the registration between the monochromatic image and the previously captured color images is determined based on a first geo-registration of the monochromatic image to earth coordinate system and a second geo-registration of the previously captured color images wherein the generation of the colored image utilizes the first geo-registration and the second geo-registration to register the pixels of the monochromatic image at viewpoint A 410 with corresponding chroma components of the pixels of the rendered previously captured color images at viewpoint A 440. As a non-limiting example: The monochromatic image is captured during a current mission by utilizing the non-visible spectrum sensor from a viewpoint having a given position and a given orientation. The given position and given orientation determine the first geo-registration of the monochromatic image to earth coordinate system. The previously captured colored images have been captured on previous missions by utilizing a color sensor from another viewpoint having another position and another orientation. Another position and another orientation determine the second geo-registration of the previously captured color images. The generation of the colored image utilizes the first geo-registration and/or the second geo-registration to register the pixels of the monochromatic image with corresponding pixels of the previously captured color images, for example by projecting the monochromatic image to the earth coordinate (using the first geo-registration) and projecting the previously captured color images to the earth coordinate (using the first geo-registration). In some cases, the registration between the monochromatic image and the previously captured color images is determined by projecting the previously captured color images on a plane that is conformal with the viewpoint. Continuing the non-limiting example, the monochromatic image is captured during a current mission by utilizing the non-visible spectrum sensor from a viewpoint A having a given position and a given orientation. The given position and given orientation can be used to determine a plane that is conformal with the given position and given orientation. The previously captured colored images have been captured on previous missions by utilizing a color sensor from another viewpoint B having another position and another orientation. These previously captured colored images can be projected on the determined plane, thereby defining a registration between the monochromatic image and the previously captured color images. The registration can be used by system 200 to render the previously captured color images rendered to viewpoint A 430. System 200 can than utilize chroma components of the pixels of the previously captured color images rendered to viewpoint A 440 to color the monochromatic image at viewpoint A 410. The coloring can be pixel by pixel. The result is the monochromatic image at viewpoint A colored with chroma components of pixels of the previously captured color images rendered to viewpoint A 450. The utilization of the chroma components mateines the objects of the original monochromatic image at viewpoint A 410. In our example, the aerial objects that were captured as part of the real-time scene in the monochromatic image at viewpoint A 410, but were not captured in the previously captured color images at viewpoint B 420 will not vanish from the colored images 450, though they can receive an unrealistic color, because of the usage of the chroma component only of the previously captured color images. In addition, past objects captured in the previously captured color images at viewpoint B 420 that do not exist in the monochromatic image at viewpoint A 410 will not be seen in the colored images 450 as the luma component of the pixels of the previously captured color images is not used. Continuing our example: an aerial object that was captured in the previously captured color images but does not exist in the monochromatic image at viewpoint A 410 will also not exist in the resulting colored images 450.

The described colored image generation process 300 used by system 200 has the following advantages:

Preservation of the visibility of objects of the live and/or real-time monochromatic image 410. The live and/or real-time monochromatic image 410 is the main contributor to the colored image generation process 300. The colored image generation process 300 preserves the visibility of all the objects and details that are in the live and/or real-time monochromatic image 410 even if they are not part of the previously captured color images. In contrast, object recognition and/or Artificial Intelligence (AI) based coloring methods can add non-existing objects to the live and/or real-time image.

Pixel based process. Colored image generation process 300 is a pixel by pixel based, where the live and/or real-time monochromatic image 410 from the monochromatic sensor is not manipulated and used as the prime element. The previously captured color images 420 format can be transformed to formats like HSV, YCbCr and others, which have a parameter for the pixel intensity ('Y' in YCbCr format, 'V' in HSV), and different parameters for the pixel color ('Cb', 'Cr' in YCbCr format, 'H', 'S' in HSV). Then, for each pixel, the intensity parameter will be replaced with the corresponding intensity parameter of the live and/or real-time monochromatic image 410. Since the illumination intensity is the most dominant factor, the colored image maintains the live image visibility, details, and the ability to identify them. As long as the big zones are applied with the right color, the overall situation awareness in the image is remarkably improved. The previously captured colored images 420 might not be coherent with the live one. Reasons can be existence of temporary objects, non-accuracy of the location and view parameters, or any change in the scene since the past image had been taken. The previously captured colored images 420 can be based on the live images, hence, such coherency issues don't affect the overall image visibility. They might cause some effects of details being colored wrong, but the goal of understanding the scene correctly is not harmed.

Colored image generation process 300 can be used for real-time situations where the user of system 200 relies on the colored images 450 for critical missions. For a non-limiting example, the user can be a pilot utilizing system 200 for the improvement of pilot situation awareness on night flights. The colored image generation process 300 is safe and fully reliable, because it is deterministic and provides immunity from any misleading behavior. In this example, the colored images 450 improve the situation awareness of the pilot in night flights scenarios, for any display, but specially—for see through displays. System 200 emphasizes big zones by adding their corresponding colors (Skies—Blue, Forest—Green, Field—Brown, etc.). The applied color can be determined from a satellite images database, which undergoes a real-time ongoing transformation to a conformal view according the accurate geolocation, height and point of view. The live and/or real-time monochromatic image 410 is the primary element in the colored image 450. The colored image 450 does not eliminate and/or vanish any of the details and shall not harm the ability to identify details, compared to the live and/or real-time monochromatic image 410. The colored image 450 does not introduce any object/detail that is not present on the live and/or real-time monochromatic image 410. If the object exists only on the previously captured image 420, it shall not be display on the colored image 450, thereby providing a "ghosts" prevention mechanism. System 200 maintains the live and/or real-time monochromatic image 410 as a primary source by keeping the luma component of the pixels of the live and/or real-time monochromatic image 410 and changing only chroma.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A system for coloring a monochromatic image of a scene, the system comprising a processing circuitry configured to:
   capture the monochromatic image of the scene utilizing a non-visible spectrum sensor, capable of capturing monochromatic images from a viewpoint having a given position and a given orientation;
   obtain one or more previously captured color images, covering at least part of the scene, wherein the previously captured color images have been captured in a time prior to the capturing of the monochromatic image;
   determine a registration between the monochromatic image and the previously captured color images, wherein the registration is determined by projecting the previously captured color images on a plane that is conformal with the viewpoint, and wherein the registration is also determined based on a first geo-registration of the monochromatic image to earth coordinate system and a second geo-registration of the previously captured color images wherein the generation of the colored image utilizes the first geo-registration and the second geo-registration to register the pixels of the monochromatic image with corresponding pixels of the previously captured color images;
   render one or more rendered images, being the previously captured color images adjusted to the viewpoint by utilizing the registration; and
   generate a colored image of the scene by changing, for at least one given pixel of the monochromatic image, values of one or more chroma components of the given pixel in accordance with values of one or more chroma components of a corresponding pixel of the rendered images.

2. The system of claim 1, wherein the monochromatic image comprises one or more imaged elements that are not included in the one or more previously captured color images and wherein the generated colored image includes the imaged elements.

3. The system of claim 1, wherein the non-visible spectrum sensor is a night vision sensor.

4. The system of claim 1, wherein the non-visible spectrum sensor is an airborne sensor.

5. The system of claim 1, wherein the colored image of the scene is in a YCbCr format.

6. The system of claim 1, wherein the colored image of the scene is in an HSV format.

7. A method for coloring a monochromatic image of a scene, the method comprising:
   capturing, by a processing circuitry, the monochromatic image of the scene utilizing a non-visible spectrum sensor, capable of capturing monochromatic images from a viewpoint having a given position and a given orientation;
   obtaining, by the processing circuitry, one or more previously captured color images, covering at least part of the scene, wherein the previously captured color images have been captured in a time prior to the capturing of the monochromatic image;
   determining, by the processing circuitry, a registration between the monochromatic image and the previously captured color images, wherein the registration is determined by projecting the previously captured color images on a plane that is conformal with the viewpoint, and wherein the registration is also determined based on a first geo-registration of the monochromatic image to earth coordinate system and a second geo-registration of the previously captured color images wherein the generation of the colored image utilizes the first geo-registration and the second geo-registration to register the pixels of the monochromatic image with corresponding pixels of the previously captured color images;
   rendering, by the processing circuitry, one or more rendered images, being the previously captured color images adjusted to the viewpoint by utilizing the registration; and
   generating, by the processing circuitry, a colored image of the scene by changing, for at least one given pixel of the monochromatic image, values of one or more chroma components of the given pixel in accordance with values of one or more chroma components of a corresponding pixel of the rendered images.

8. The method of claim 7, wherein the monochromatic image comprises one or more imaged elements that are not included in the one or more previously captured color images and wherein the generated colored image includes the imaged elements.

9. The method of claim 7, wherein the non-visible spectrum sensor is a night vision sensor.

10. The method of claim 7, wherein the non-visible spectrum sensor is an airborne sensor.

11. The method of claim 7, wherein the colored image of the scene is in a YCbCr format.

12. The method of claim 7, wherein the colored image of the scene is in an HSV format.

13. A non-transitory computer readable storage medium having computer readable program code embodied therewith, the computer readable program code, executable by at least one processor of a computer to perform a method for detecting movement of at least one non-line-of-sight object, the method comprising:
   capturing, by a processing circuitry, the monochromatic image of the scene utilizing a non-visible spectrum sensor, capable of capturing monochromatic images from a viewpoint having a given position and a given orientation;
   obtaining, by the processing circuitry, one or more previously captured color images, covering at least part of the scene, wherein the previously captured color images have been captured in a time prior to the capturing of the monochromatic image;
   determining, by the processing circuitry, a registration between the monochromatic image and the previously captured color images, wherein the registration is determined by projecting the previously captured color images on a plane that is conformal with the viewpoint, and wherein the registration is also determined based on a first geo-registration of the monochromatic image to earth coordinate system and a second geo-registration of the previously captured color images wherein the generation of the colored image utilizes the first geo-registration and the second geo-registration to register the pixels of the monochromatic image with corresponding pixels of the previously captured color images;

rendering, by the processing circuitry, one or more rendered images, being the previously captured color images adjusted to the viewpoint by utilizing the registration; and generating, by the processing circuitry, a colored image of the scene by changing, for at least one given pixel of the monochromatic image, values of one or more chroma components of the given pixel in accordance with values of one or more chroma components of a corresponding pixel of the rendered images.

* * * * *